Jan. 11, 1927.
O. K. DYER
1,614,190
FAN BRACKET OR SUPPORT
Filed June 8, 1925
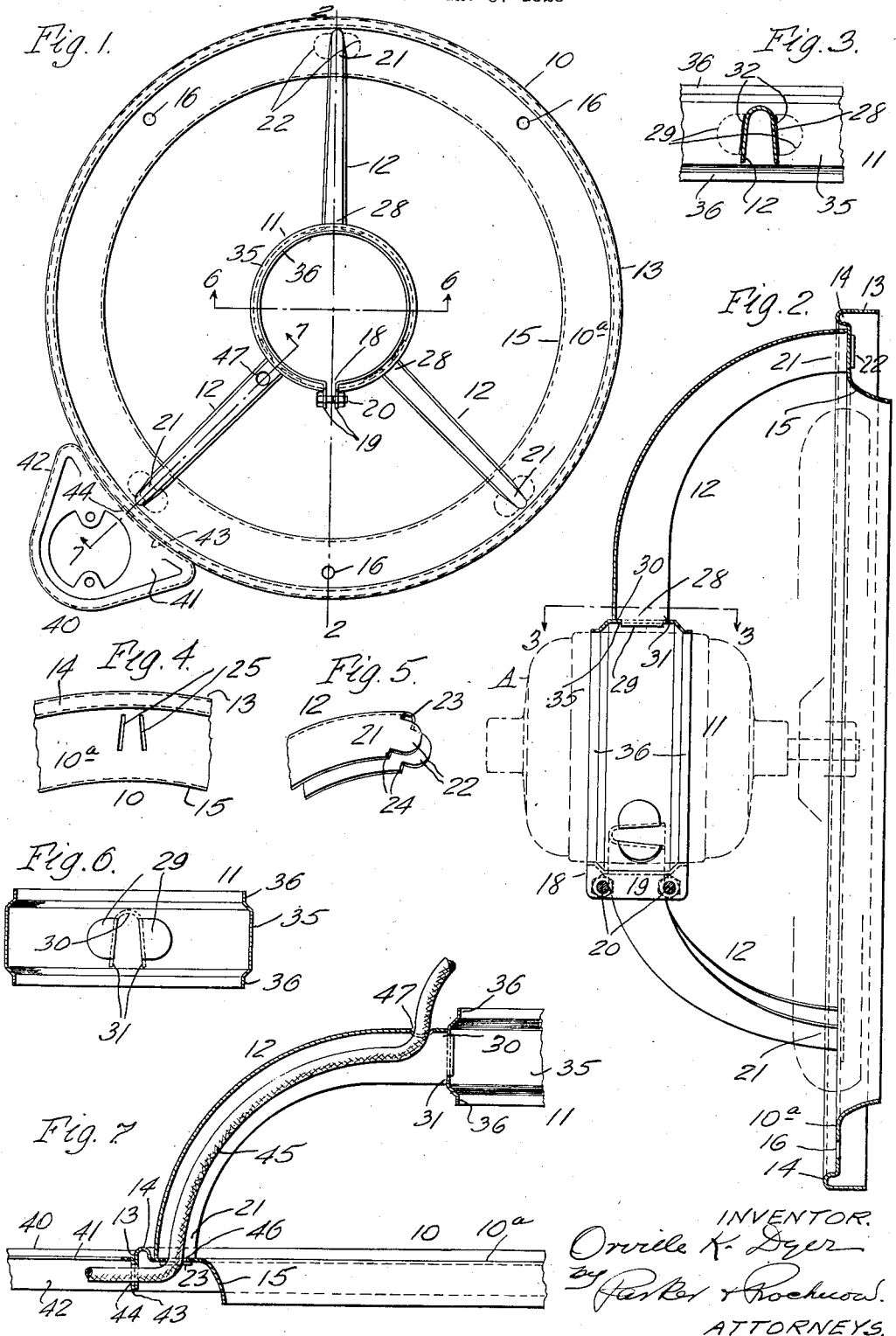
INVENTOR.
Orville K. Dyer
By Parker & Rockwood
ATTORNEYS.

Patented Jan. 11, 1927.

1,614,190

UNITED STATES PATENT OFFICE.

ORVILLE K. DYER, OF BUFFALO, NEW YORK, ASSIGNOR TO BUFFALO FORGE COMPANY, OF BUFFALO, NEW YORK.

FAN BRACKET OR SUPPORT.

Application filed June 8, 1925. Serial No. 35,583.

This invention relates to improvements in supporting brackets or frames for rotary fans.

The supporting brackets or devices for this purpose heretofore provided have usually been formed of one or more castings bolted or riveted together. Such constructions are heavy and cumbersome, as well as costly, and the castings are frequently broken in shipment and their weight adds appreciably to the shipping costs. The connecting arms or portions of such cast constructions are of relatively large cross sectional area such that the air currents passing through the frame when the fan is in operation are appreciably interrupted or obstructed. Furthermore, the bolts or securing devices often work loose, so that when the fan is in operation, rattling of the parts occurs, and the connected parts of the supporting frame often become detached with resulting interruption in operation and possible damage to the fan and its motor.

The objects of the present invention are to provide a supporting bracket or frame for rotary fans of the character described, which is constructed entirely of sheet metal; also to provide a sheet metal structure of this character which is very rigid and of relatively light weight, and which is formed to offer the minimum obstruction to the flow of air; also to provide a bracket of this character in which the supporting arms or members extending between the attaching frame and the supporting member or portion is so attached to these members that even should the connections between these parts become loosened, the parts cannot separate, thereby preventing injury to the fan and motor; also to provide a fan supporting bracket in which the parts can be quickly and easily stamped out and assembled; and also to improve supporting brackets or frames of this character in the other respects hereinafter specified and claimed.

In the accompanying drawings,

Fig. 1 is a front elevation or face view of a supporting bracket or frame for rotary fans embodying one form of my invention.

Fig. 2 is a sectional elevation thereof, on an enlarged scale, on line 2—2, Fig. 1, showing in broken lines a fan and motor in position therein.

Fig. 3 is a fragmentary sectional view thereof on line 3—3, Fig. 2.

Fig. 4 is a fragmentary face view of a portion of the attaching or supporting ring of the bracket.

Fig. 5 is a perspective view of an end of one of the radial arms of the bracket.

Fig. 6 is a horizontal section, on an enlarged scale, on line 6—6, Fig. 1, of the fan supporting hub or ring of the bracket.

Fig. 7 is a fragmentary sectional elevation of the bracket, on an enlarged scale, on line 7—7, Fig. 1.

The fans are usually operated either by an electric motor on the extended shaft of which the fan is secured, or by means of a pulley secured on a shaft journalled in a bearing adjacent the fan, the fan being also secured to the shaft, usually on the opposite side of the bearing to that on which the pulley is disposed.

The supporting brackets usually comprise an attaching frame or member adapted to be rigidly fixed to a wall, partition or other support, a hub or supporting member axially alined with the attaching frame, and one or more arms or connecting members extending between the attaching frame and said hub for maintaining the hub in correct relation to said frame. When the fan is to be motor driven, the hub is used to embrace and support the motor, while in the case of fans operated through the medium of a pulley, the hub supports the bearing for the pulley and fan shaft.

In the preferred embodiment of the invention shown in the drawings, the fan supporting frame or bracket includes a ring or attaching frame or member 10 which is adapted to be rigidly secured to a support, an annular hub or member 11 adapted to be attached to and support a fan motor or fan shaft bearing and which is disposed axially relatively to the member 10, and one or more connecting members or arms 12 for supporting and securing the hub 11 to the attaching frame or member 10.

The attaching frame member 10 is preferably in the form of an annular sheet metal stamping of substantially channel shaped cross section, having a substantially flat faced portion 10ª, a peripheral annular flange 13 preferably connected to the face portion 12 by a stiffening bead or edge 14, and an inner curved flange 15 which is adapted, when the fan is used in an opening in a wall or partition, to extend into the opening in the support to which the fan is secured, not shown. The member 10 is provided with a plurality of holes 16 preferably formed in the face portion 10ª for reception of suitable bolts, screws or other attaching devices for securing the supporting bracket to the support or over the opening in the wall or partition.

The member or hub 11 is also in the form of a sheet metal stamping or ring which is preferably split or divided at 18 so that the hub may yield or be sprung slightly, and the adjacent ends are formed with a pair of lugs 19 apertured to receive one or more bolts 20, so that after the motor A (or a shaft bearing) has been positioned in the member 11, the bolts 20 may be tightened to firmly hold the motor or bearing, and maintain the fan in correct position.

The radial arms or connecting members 12, of which there are three in the construction shown, are in the form of curved sheet metal stampings of U-shaped cross section, each of which is secured at one end to the attaching frame or member 10, the opposite end of each arm being connected to the hub 11 in a plane at substantially right angles to the face portion 10ª of the member 10. The arms are curved between their ends, as shown in Figs. 2 and 7, so as to locate the hub 11 at a distance from one face of the member 10.

The outer ends 21 of the arms 12 are preferably secured to the member 10 in the following manner. When the arms 12 are blanked out in the formation thereof, a pair of lugs 22 of the form shown in Fig. 5 is produced and which are proportioned so that when the arm is bent into its U-shaped cross section, shoulders or abutments 23 and 24 are provided, and the frame member 10 is formed with pairs of slits 25 adapted to receive the lugs 22, which are inserted thereinto, with the shoulders 23 and 24 abutting against the outer side of the portion 12. The lugs are then rigidly secured in the slits 25, preferably by bending the lugs laterally in opposite directions against the opposite side of the face portion 10ª, see Figs. 1 and 3, and may then be further secured thereto, preferably by welding. While shoulders are shown at opposite sides of the lugs, shoulders may be formed at one side only thereof, if desired.

The inner ends 28 of the arms 12 are similarly formed with lugs 29 and shoulders 30 and 31, and these ends of the arms are connected to the hub 11, in a manner similar to that just described, by passing the lugs 29 through slits 32 in the hub, and then bending the lugs in opposite directions into engagement with the inner face of the hub and spot welding them thereto.

In the preferred construction shown, the hub is preferably pressed outwardly between its side edges, forming an annular portion 35 of greater diameter than the motor or bearing engaging side portions 36, and the slits 32 are formed in this portion 35 so that the lugs 29, when secured in this depressed portion are out of contact with the motor A, thus permitting the edge portions 36 to grip the motor or bearing firmly when the bolts 20 are tightened. The motor or shaft bearing cannot be displaced or loosened by vibrations or due to the use of the fan, and rattling between the parts is prevented.

The fan supporting bracket constructed as described is very rigid, strong, and light in weight, and the cross sectional shape and relative proportion of the arms 12 is such that the flow of air through the bracket is obstructed to a minimum extent, and this condition is further carried out by providing the sheet metal hub which projects only to a slight degree around the motor or bearing about which it is secured, thus allowing the maximum space for the passage of the air blast between the hub and the attaching frame or member 10. The member 10 being of relatively thin sheet metal construction, is also of minimum bulk and extends only a slight distance into the air space.

A particular advantage gained by connecting the radial arms to the members 10 and 11 in the manner described is that, after the lugs have been inserted into the slits and bent laterally as described, these arms cannot become detached from said members even if the welded connections should be destroyed or be improperly formed, for the reason that the respective members are engaged on one side by the lugs and on the opposite side by the shoulders formed on the ends of the arms, thus preventing endwise movement of the arms in either direction relatively to the attached members.

If desired, the fan supporting bracket or frame may be provided with a switch supporting member or plate 40 formed so that a suitable control switch, not shown, may be attached thereto and from which the usual conductors may be led to the motor. In the construction shown, the switch supporting plate 40 is formed of sheet metal and has a substantially flat face portion 41, preferably extending substantially in the plane of the face 12 of the attaching frame 10, and an exterior flange 42 which includes an attaching portion 43 which is curved to correspond with the arc of the peripheral flange 13 of the frame member 10 and to which it is adapted to be welded or otherwise rigidly secured, see Figs. 1 and 7. When the fan is to be operated by an electric motor, the attached flanges 43 and 13 are preferably provided with registering holes 44 for the passage therethrough of the conducting wires 45, which are then carried through a hole or aperture 46 in the face portion 12 of the member 10. This hole 46 is formed directly between a pair of the slits 25 so that the conductors 45 may be disposed inside of the adjacent arm 12 and pass therein to the motor, said arm being formed with an aperture 47 adjacent the hub 11 through which said conductors 45 may be extended. In this manner the conductors 45 are not only concealed within the arm 12, thus producing a neat and tidy appearance, but in addition, the conductors thus located, do not offer any resistance to or obstruct the flow of air. The switch plate 40 constructed and arranged as described does not extend in either direction beyond the inner and outer planes of the frame member 10 so that the supporting bracket and attached switch plate occupies relatively small space, and further, the switch plate is less liable to be injured or the switch broken than would be the case if the switch plate were secured on and projected from the face of the frame member.

The fan bracket described has the advantage of being very much lighter in weight than brackets heretofore used, and furthermore the brackets are stronger and are practically unbreakable in ordinary use and handling. The bracket also is sufficiently flexible so that considerable movement of the hub portion is possible for clamping a motor or bearing therein.

I claim as my invention:—

1. A supporting bracket for a rotary fan, comprising an attaching frame, a supporting hub for said fan disposed at a distance from one face of said frame, and a plurality of sheet metal radial arms bent in the direction of their length to produce a relatively narrow, substantially U-shaped cross section which imparts rigidity to said arms, said arms being rigidly secured to and extending between said attaching frame and said supporting hub, and said arms having their open U-shaped faces extending in the direction in which the air is discharged by said fan, whereby a minimum of resistance is offered to the passage of air by said arms.

2. A supporting bracket for a rotary fan or the like, comprising an attaching frame, a supporting hub disposed at a distance from one face of said frame, sheet metal radial arms extending between said frame and said hub, lugs at the ends of said arms, abutments on said arms adjacent said lugs, said lugs being adapted to pass through slits in said frame and said hub so as to engage said abutments with one face of said frame and one face of said hub, and said lugs being adapted to be bent against the opposite faces of said frame and said hub.

3. A supporting bracket for a rotary fan or the like, comprising an attachment frame, a supporting hub disposed at a distance from one face to said frame, sheet metal radial arms of substantially U-shaped cross section extending between said frame and said hub, lugs at the extremities of said arms which extend lengthwise in the plane of the webs thereof, shoulders extending transversely of said arms adjacent said lugs, said lugs being adapted to pass through slits in said frame and said hub with said shoulders abutting against one face on each of said members, and said lugs being adapted to be bent against the opposite faces of said frame and said hub.

4. In a sheet metal structure having two spaced annular members and a connecting arm extending therebetween, securing means between said arm and one of said members comprising a pair of spaced lugs extending lengthwise from an end of said arm, shoulders extending transversely thereof adjacent said lugs, and said lugs being adapted to pass through slits in said member and be secured to one face thereof, and said shoulders being adapted to engage the other face thereof to prevent endwise movements of said arm relatively to said member.

5. In a sheet metal supporting bracket for a rotary fan or the like, an attaching frame, a motor supporting hub, arms extending between and connected to said frame and said hub, connecting means between said arms and said hub including parts engaging the inner face thereof, and said hub having an annular portion between its edge portions of larger diameter than said edge portions, whereby said edge portions are adapted to engage a motor or other object, and said parts of said connecting means are adapted to be held out of contact with said motor.

6. In a sheet metal supporting bracket for a rotary fan or the like, an attaching frame, a supporting hub, arms extending between and connected to said frame and said hub, said attaching frame having a face portion and an annular peripheral flange, a switch supporting plate including a face portion to which a switch may be secured and a flange formed on an arc corresponding to the arc of said attaching frame flange and adapted to abut against and be secured thereto.

7. In a sheet metal supporting bracket for a rotary fan or the like, an attaching frame, a supporting hub, arms extending between and connected to said frame and said hub, said attaching frame having a face portion and an annular peripheral flange, a switch supporting plate including a face portion adapted to extend substantially in the plane of said attaching frame face and a flange formed on an arc corresponding to the arc of said attaching frame flange and adapted to abut against and be secured thereto.

8. In a sheet metal supporting bracket for a rotary fan or the like, an attaching frame, a supporting hub, hollow arms extending between and connected to said frame and said hub, said attaching frame having a face portion and an annular peripheral flange, a switch supporting plate including a face portion to which a switch may be secured, a flange formed on an arc corresponding to the arc of said attaching frame flange and adapted to abut against and be secured thereto adjacent one of said hollow arms, said attached flanges and said attaching frame face portion having apertures adapted to permit conductors to be directed from said switch into said adjacent hollow arm so as to be substantially concealed thereby.

9. A supporting bracket for rotary fans and the like, comprising a sheet metal attaching frame having a portion of substantially channel shaped cross section, arms of sheet metal having portions at the ends thereof which are adapted to enter into openings in said attaching frame into the channel portion thereof and to be secured thereto, and a fan supporting member held by said arms.

10. A supporting bracket for a rotary fan or the like, comprising a sheet metal attaching frame having a portion of substantially channel shaped cross section, a sheet metal supporting hub disposed at a distance from a face of said frame and having an outwardly extending portion, arms of sheet metal having lugs at the ends thereof adapted to enter through holes in said frame and hub into the channel of the frame and into the outwardly extending portion of said hub and to be secured to said frame and hub.

11. A supporting bracket for rotary fans and the like, comprising a sheet metal attaching frame having a portion of substantially channel shaped cross section, arms of sheet metal and substantially channel shaped in cross section, and having lugs extending outwardly beyond the ends of said arms and adapted to extend through openings in said attaching frame and into the channelled portions thereof and to be secured thereto, and a fan supporting member held by said arms.

ORVILLE K. DYER.